Dec. 13, 1960 R. POWERS 2,964,160
MACHINE FOR ADVANCING ARTICLES
Filed Dec. 19, 1957 5 Sheets-Sheet 1

INVENTOR.
RICHARD POWERS
BY
ATTORNEYS

Dec. 13, 1960 R. POWERS 2,964,160
MACHINE FOR ADVANCING ARTICLES
Filed Dec. 19, 1957 5 Sheets-Sheet 3

INVENTOR.
RICHARD POWERS
BY
ATTORNEYS

INVENTOR.
RICHARD POWERS

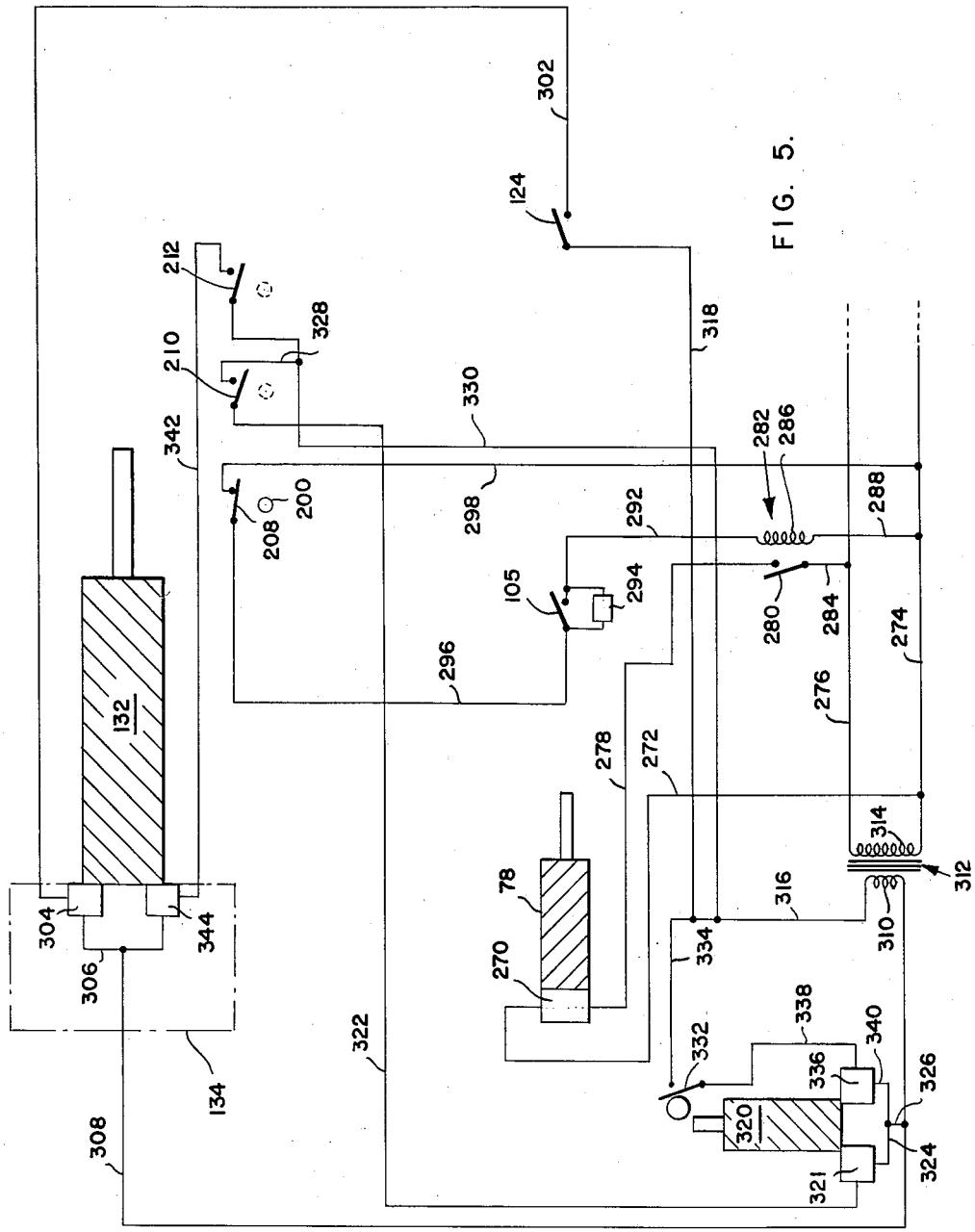

United States Patent Office 2,964,160
Patented Dec. 13, 1960

2,964,160
MACHINE FOR ADVANCING ARTICLES

Richard Powers, Broomall, Pa., assignor to Bulletin Company, Philadelphia, Pa., a corporation of Pennsylvania Filed Dec. 19, 1957, Ser. No. 703,778

3 Claims. (Cl. 198—24)

This invention relates to a machine for advancing articles and, more particularly, relates to such a machine having particular utility for advancing articles a predetermined distance.

The broad object of this invention is to provide an article advancing machine which is adapted to advance an article a predetermined distance from the discharge end of a conveyor without interfering with the use of the conveyor to advance articles to its end. This and other objects of this invention will become apparent on reading the following description in conjunction with the drawings in which:

Figure 5 is a schematic wiring diagram of the control circuits for the machine of Figure 1.

Figure 1:
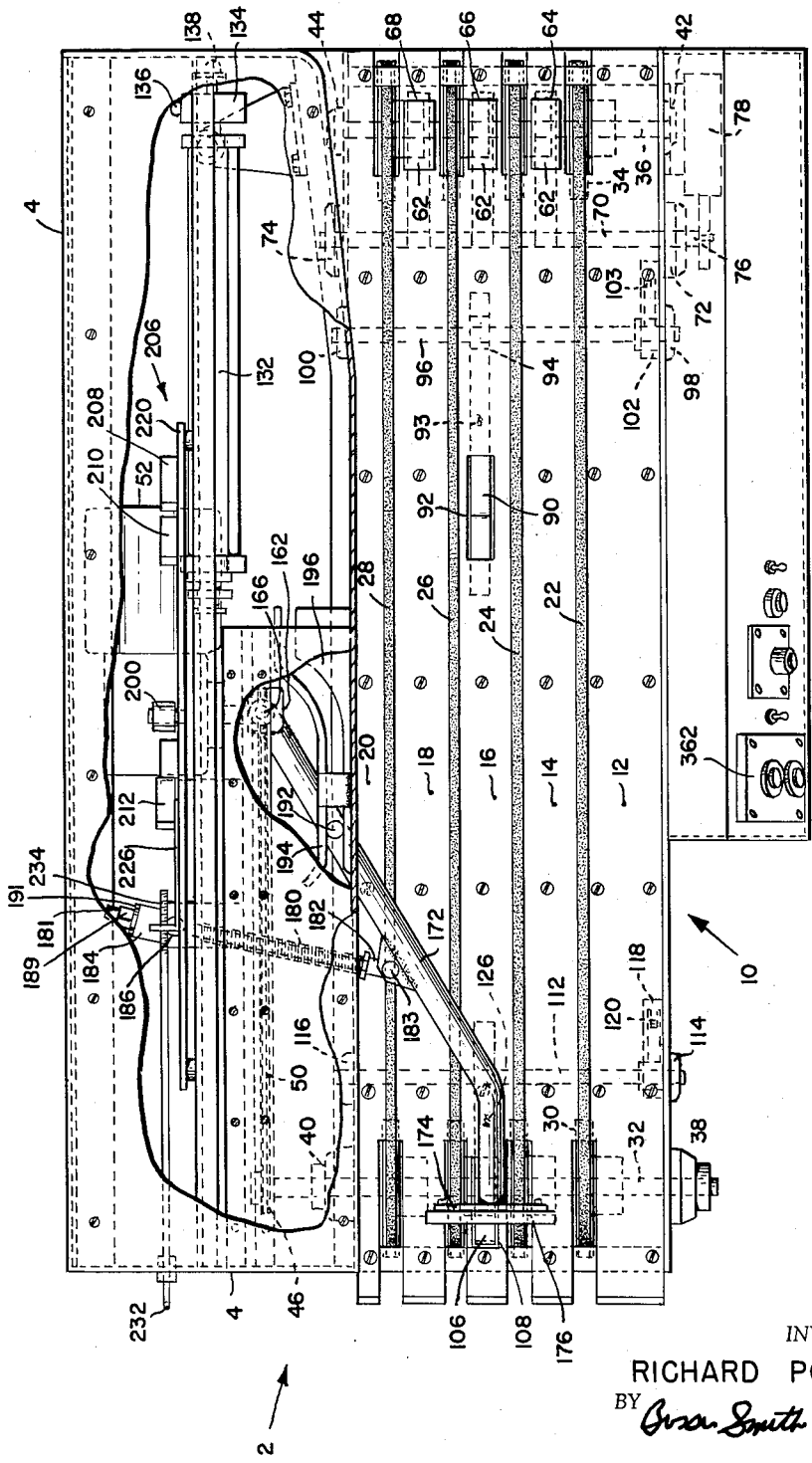
Figure 1 is a plan view of a machine in accordance with this invention.

It will be understood that the machine of this invention is not in any way limited by the apparatus with which it is employed. However, for purposes of illustration, the machine of this invention will be discussed in association with a typical wire tying machine for tying-up, for example, a bundle of newspapers.

As shown in the drawings, a machine 2 in accordance with this invention is provided with a supporting frame 4 which has four feet 6 adjustably bolted to frame 4 as indicated at 8 in order to provide means for properly leveling the machine 2.

A conveyor 10 is mounted on frame 4. Conveyor 10 has longitudinal plates 12, 14, 16, 18 and 20 (Figure 1). Conveyor belts 22, 24, 26 and 28 run between plates 12 through 20 and, as shown in Figure 1, each belt is carried by a forward pulley 30 mounted to rotate with shaft 32 and a rear pulley 34 mounted for rotation with shaft 36.

Figure 3:
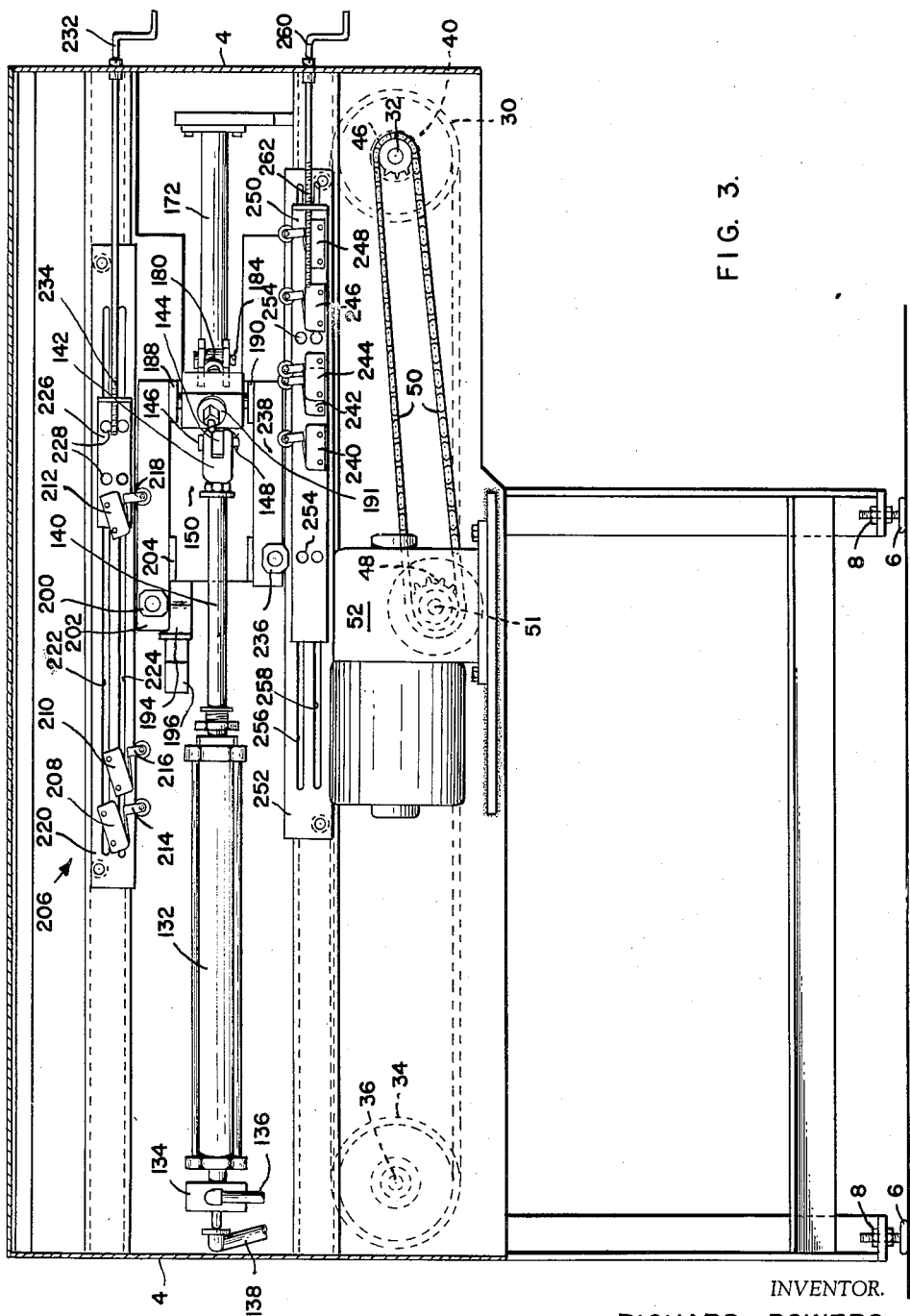
Figure 3 is a rear elevation of the machine of Figure 1.

Shaft 32 is mounted for rotation in bearings 38 and 40 which are secured to frame 4. Shaft 36 is mounted for rotation with bearings 42 and 44 and, as best seen in Figure 3, has secured at one end a sprocket 46 connected to a sprocket 48 by chain 50. Sprocket 48 is mounted on drive shaft 51 of reduction geared motor 52. The conveyor as thus described is a standard, well known belt conveyor.

Conveyor 10 at its inlet end is provided with gate member 62 (Figures 1 and 2) which are adapted to project upwardly through openings 64, 66 and 68 in plates 14, 16 and 18, respectively. Members 62 are fixedly secured to a shaft 70 which is rotatably mounted in bearing blocks 72 and 74. A lever 76 is fixedly secured to shaft 70 and has a slot 77 connected to a pin on ram 78 as indicated at 80. Ram 78 is secured to a bracket 82 mounted on frame 4.

Figure 2:
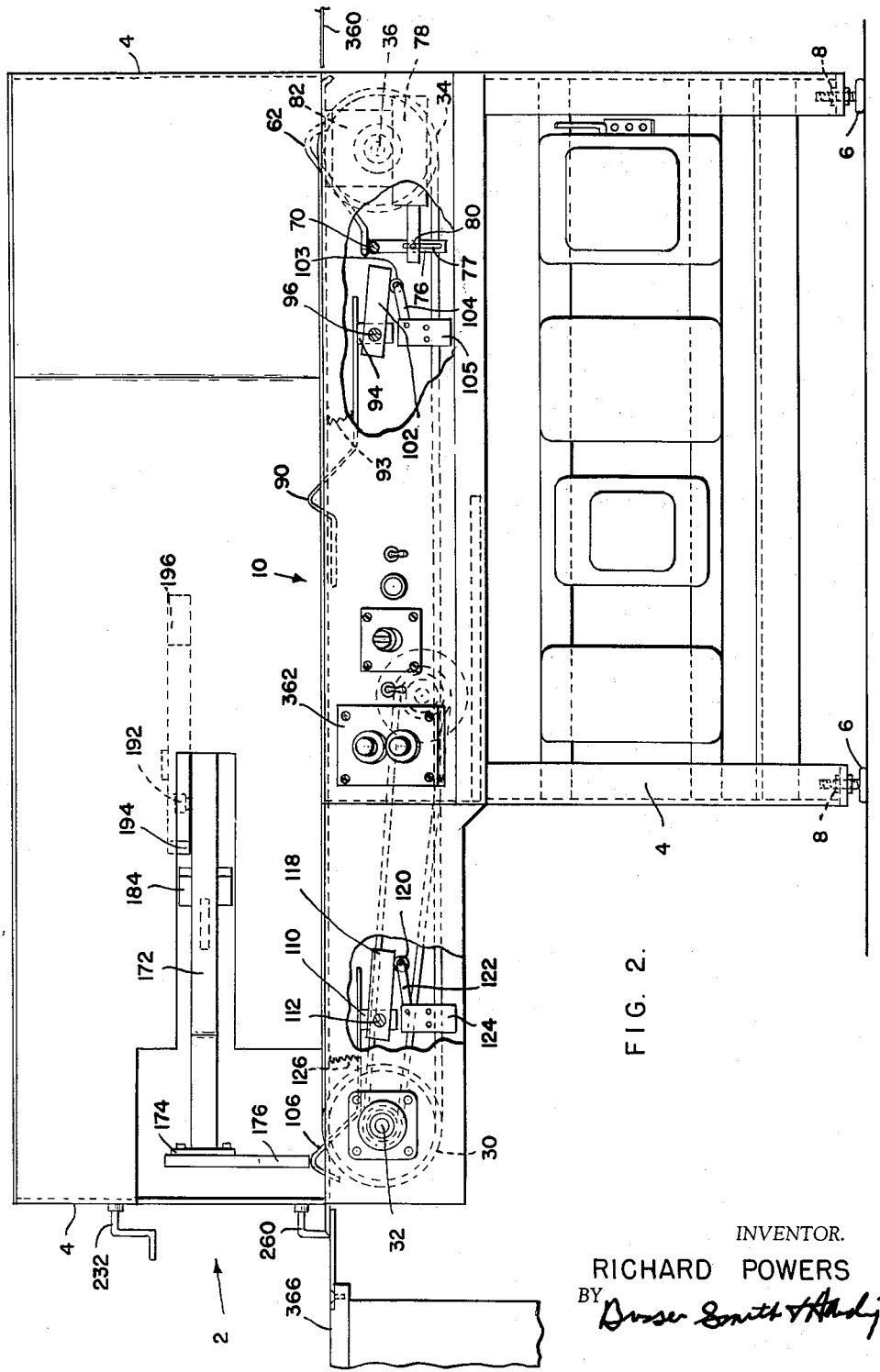
Figure 2 is a front elevation of the machine in Figure 1.

A finger 90 is adapted to project upwardly through an opening 92 in plate 16 (Figures 1 and 2). Finger 90 is biased upwardly by extension coil spring 93 which is secured to finger 90 and plate 16. Finger 90 is secured to a block 94 which, in turn, is fixedly secured to a shaft 96. Shaft 96 is mounted for rotation in bearing blocks 98 and 100. A lever 102 is fixedly secured to shaft 96 and engages a roller 103 on lever 104 of switch 105, lever 104 being biased upwardly in a conventional manner.

A finger 106 is adapted to project upwardly through an opening 108 in plate 16 (Figures 1 and 2). Finger 106 is fixedly secured to a block 110 which, in turn, is fixedly secured to a shaft 112 mounted for rotation in bearing blocks 114 and 116. A lever 118 is fixedly secured to shaft 112 and engages a roller 120 on lever 122 of switch 124, lever 122 being biased upwardly in a conventional manner. Finger 106 is biased upwardly by an extension coil spring indicated at 126, the coil spring 126 being secured to both finger 106 and plate 16.

Referring now to Figure 3, a double-acting hydraulic ram 132 is controlled by an electrically actuated valve 134. Valve 134 is supplied with fluid under pressure by line 136 and is connected to a discharge line 138. Rod 140 of ram 132 has a clevis 142 secured to its end. Clevis 142 is secured to a pad eye 144 by means of a headed pin 146 which is maintained in position by a cotter pin 148.

Figure 4:
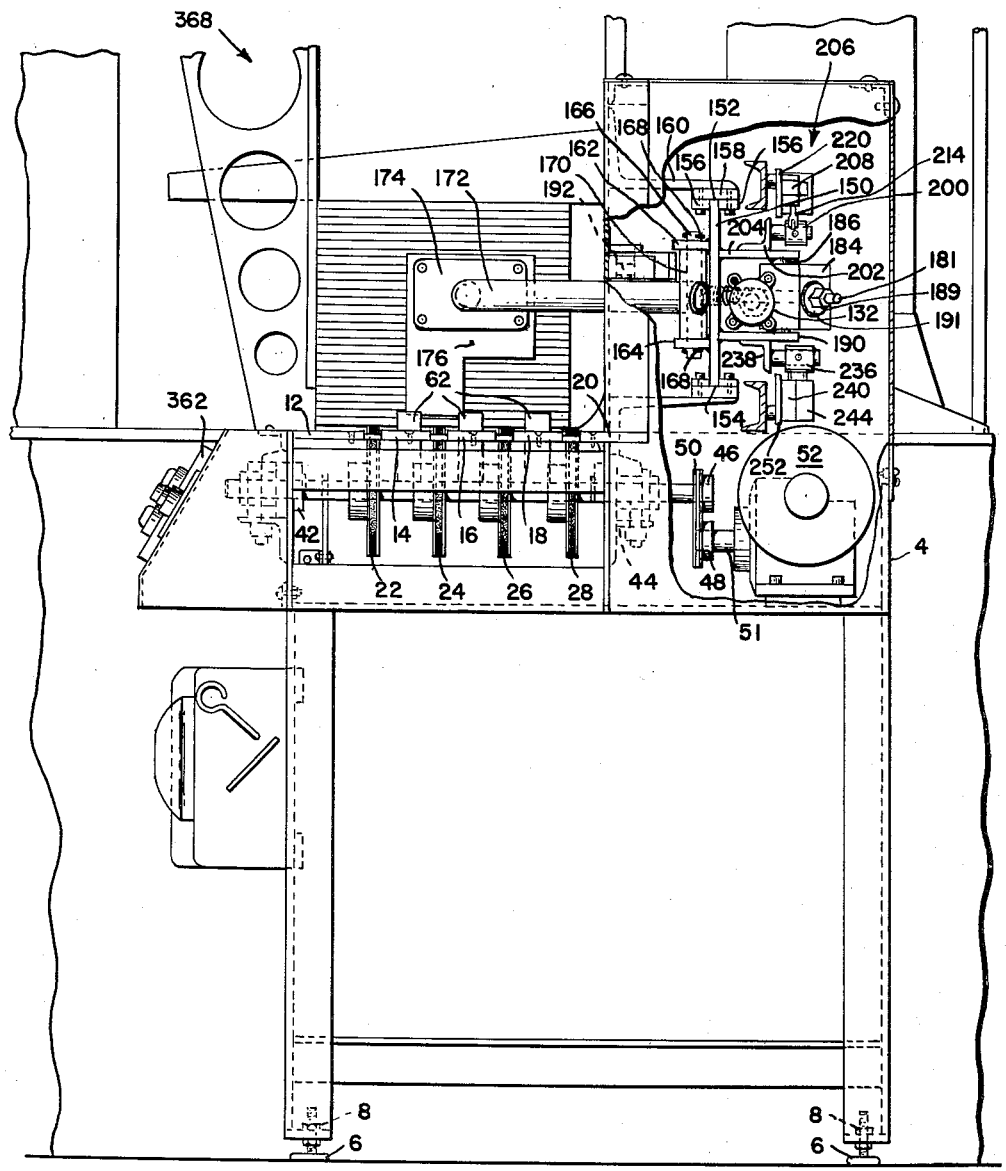
Figure 4 is an end view of the machine of Figure 1 showing a portion of a wire tying machine.

Pad eye 144 is secured to a slide 150 which, as best shown in Figure 4, is slidably mounted in tracks 152 and 154. Tracks 152 and 154 are each formed by strips 156 bolted to a plate 158 welded to an angle member 160 secured to frame 4.

Slide 150 carries brackets 162 and 164 through which passes a pin 166 which is retained by cotter pins 168. Pin 166 passes through a tube 170 which is welded to a pusher arm 172. Thus arm 172 is effectively mounted so as to pivot on the axis of pin 166. A plate 174 is secured to arm 172 and, in turn, is bolted to a pusher plate 176 which is adapted to engage the article to be advanced.

As best seen in Figures 1 and 4, arm 172 is biased towards conveyor 10 by a compression coil spring 180 which surrounds a rod 181 which is secured to a member 182 which, in turn, is pivotally secured to arm 172 as shown at 183. The other end of rod 181 freely passes through block 184 which is pivotally mounted on a pin 186 secured to brackets 188 and 190, which are welded to slide 150. Rod 181 has a nut 189 threaded to its end adjacent the block 184 and a washer 191 interior of the nut.

A cam follower 192 is secured to arm 172 and is adapted to engage a cam track formed by cam member 194 and cam member 196 which are best seen in Figure 1.

A switch operating member 200 (Figures 3 and 4) is mounted on an angle member 202 which, in turn, is supported by bracket 188 and bracket 204 which is secured to slide 150.

A switch control system 206 (Figure 3) is provided with switches 208, 210 and 212, which have downwardly biased control levers 214, 216 and 218, respectively. These switches are mounted on a frame member 220 secured to frame 4 and provided with slots 222 and 224. Switches 208 and 210 are directly secured to member 220 while switch 212 is secured indirectly through being secured to a bracket 226 which is provided with a plurality of pins 228 which engage slots 222 and 224 to permit bracket 226 to slide longitudinally with respect to member 220. Movement of bracket 226 is accomplished by a crank 232 which has a threaded end 234 threadably engaging bracket 226.

In order to provide for more complex movements of the pusher arm, for example, in order to provide for an initial push and then a second push on the same bundle, there is provided an additional switch operating member 236 mounted on member 238 which is secured to slide 150. Operating member 236 is adapted to engage switches 240, 242, 244, 246 and 248 which are mounted on a bracket 250 slidably connected to member 252 by pins 254 engaging slots 256 and 258. Bracket 250 can be moved longitudinally by a crank 260 having a threaded end portion 262 which threadably engages bracket 250. This latter switching system will not be described in detail and is included simply to show that additional switching facilities can accomplish a variety of actions of the pusher arm 172.

Referring now to the wiring diagram of Figure 5, ram 78 which controls gate members 62 is controlled by a solenoid valve 270 which, when not energized, positions valve 270 so that the ram will retain fingers 62 depressed below the conveying belts and plates. Solenoid valve 270 is connected by line 272 to line 274 which, together with line 276, form the power lines for the control circuits. Lines 274, 276 may, for example, be connected into a 110 volt system. Solenoid valve 270 is also connected to line 278 which is connected to switch 280 of a relay 282. Switch 280 is connected by line 284 to line 276. One side of relay coil 286 of relay 282 is connected to line 274 by line 288 and the other side is connected to switch 105 by line 292. Switch 105 is provided with a holding coil 294 to keep the switch in the closed position when energized. Line 296 connects switch 105 and switch 208. Switch 208 is held in a normally closed position by cam member 200 when ram 132 is in the retracted position. Switch 208 is connected to line 274 by line 298.

Ram 132 is actuated by the closing of switch 124. Switch 124 is connected by line 302 to coil 304 of valve 134 which positions the valve for forward movement of the ram 132. Coil 304 is also connected to lines 306 and 308 to coil 310 of transformer 312. Coil 314 of transformer 312 is connected to lines 274 and 276. Coil 310 is also connected to switch 124 through lines 316 and 318.

Switch operating member 200 is also adapted to close the normally opened switch 210. Switch 210 is associated with apparatus to be used in connection with the mechanism of this invention, for example, a wire tying machine 320 which is adapted to tie up the bundle being fed forward. Switch 210 is connected to a solenoid control valve 321 associated with ram 320 by line 322. Solenoid control valve is also connected to line 308 by lines 324 and 326. Switch 210 is connected to line 316 by lines 328 and 330.

The forward movement of ram 320 causes the actuation of switch 332 causing the return movement of ram 320. Switch 332 is connected to line 316 by line 334 and to solenoid control valve 336 by line 338. Solenoid control valve 336 is connected to line 326 by line 340.

The return of ram 132 is accomplished by the actuation of normally open switch 212 which is adapted to be closed by cam operating member 200. Switch 212 is connected to line 330 and is also connected to line 342 which, in turn, is connected to coil 344 of valve 134 which positions the valve for the retraction of ram 132.

*Operation*

Referring first to Figure 2, the apparatus in accordance with this invention would normally be associated with a continuous operating supply conveyor indicated schematically at 360. Conveyor 10 would normally operate continuously through the continuous operation of motor 52 which, although not shown in the wiring diagram of Figure 5, would be connected to line 274 and 276 and controlled by the switch 362 shown in Figure 2.

As a bundle, for example, a bundle of newspapers, is fed onto conveyor 10, it will pass freely over retracted gate members 62 and advance over finger 90 to depress it against the action of spring 93, rotating shaft 96 and lever 102 to actuate switch 105 which, since switch 208 is being held closed by switch operating member 200, acts to energize coil 286 of relay 282 closing the relay switch member 280 and actuating solenoid control valve 270 to cause air to be admitted to ram 78 actuating the ram rearwardly to force gate members 62 upwardly to prevent any further bundles from moving onto conveyor 10.

As the bundle is advanced by conveyor 10, it engages member 106 depressing it to rotate shaft 112, lever 118 and thus close switch 124. This results in coil 304 being actuated to provide air to ram 132 to cause the ram to move forwardly.

As ram 132 moves forwardly, switch operating member 200 advances away from switch 208 and permits it to open thus deenergizing coil 286 and opening switch 280 to deenergize solenoid control valve 270 which causes ram 78 to be provided with air to cause the ram to move forwardly and lower gate member 62. It will be noted that after the bundle is moved across finger 90, spring 93 would cause finger 90 to move upwardly thus opening switch 105. However, the circuit was held closed by virtue of relay coil 294 keeping switch 290 closed.

As the ram 132 continues to move forwardly, arm 172 is moved outwardly by spring 180 as limited by the engagement of cam follower 192 on cam track 194. Pusher pad 176 is thus moved directly behind a bundle and as the ram continues to move forwardly, the pusher pad 176 engages the bundle and urges it forwardly off conveyor 10 to an operating platform 366 (Figure 2) associated with the apparatus 2. As previously indicated, the platform 366 may be the station for tying bundles by a tying mechanism 368 whose clamping arms 370 and 372 are shown in part in Figure 4. As the ram 132 continues to move forward, switch operating member 200 closes switch 210 which actuates solenoid control valve 321 to admit air to ram 320 so as to cause the ram to actuate a foot pedal (not shown) controlling the wire tying machine. Near the end of its travel, ram 320 closes switch 332 engaging solenoid valve 240 which causes the ram to retract to its starting position.

As ram 132 advances further, switch operating member 200 closes switch 212 which energizes coil 344 to position valve 134 to cause ram 132 to retract back to its original position.

As ram 132 returns to its original position, switch 212 is opened and switch operating member 200 returns to close switch 208. At the same time pusher arm 172 is moved rearwardly and inwardly by cam follower 192 and members 194 and 196 to a position clear of the conveyor 10.

It is not desired to be limited except as set forth in the following claims.

What is claimed is:

1. In combination with a conveyor, a pusher arm for advancing an article away from one end of the conveyor, a ram lying substantially parallel to the conveyor and spaced from the area above said conveyor, a slide lying substantially parallel to the conveyor and spaced from the area above the conveyor, said ram being connected to said slide, means pivotally connecting said slide and said arm, a fixed cam spaced from the area above the conveyor, a cam follower spaced from the area above the conveyor connected to said arm and in engagement with the cam, said cam and cam follower positioning the arm behind an article on the conveyor when the ram moves in one direction and retracting the arm clear of the conveyor to permit free passage of an article on the conveyor when the ram is moved in the opposite direction.

2. In combination with a conveyor, a pusher arm for advancing an article away from one end of the conveyor, a ram lying substantially parallel to the conveyor and spaced from the area above said conveyor, a slide lying substantially parallel to the conveyor and spaced from the area above the conveyor, said ram being connected to said slide, means pivotally connecting said slide and said arm, a fixed cam spaced from the area above the conveyor, a cam follower spaced from the area above the conveyor connected to said arm and in continuous engagement with the cam, said cam and cam follower positioning the arm behind an article on the conveyor when the ram moves in one direction and retracting the arm clear of the conveyor to permit free passage of an article on the conveyor when the ram is moved in the opposite direction.

3. In combination with a conveyor, a pusher arm for advancing an article away from one end of the conveyor, a ram lying substantially parallel to the conveyor and spaced from the area above said conveyor, a slide lying substantially parallel to the conveyor and spaced from the area above the conveyor, said ram being connected to said slide, means pivotally connecting said slide and said arm, a fixed cam spaced from the area above the conveyor, a cam follower spaced from the area above the conveyor connected to said arm and in continuous engagement with the cam, spring means biasing the arm towards the area above the conveyor, said cam and cam follower positioning the arm behind an article on the conveyor when the ram moves in one direction and retracting the arm clear of the conveyor to permit free passage of an article on the conveyor when the ram is moved in the opposite direction.

References Cited in the file of this patent

UNITED STATES PATENTS

| | | |
|---|---|---|
| 2,630,750 | Eberle | Mar. 10, 1953 |
| 2,662,630 | Freholm | Dec. 15, 1953 |
| 2,776,742 | Langenberg | Jan. 8, 1957 |
| 2,797,807 | Butterfield | July 2, 1957 |